United States Patent [19]
Bellerby et al.

[11] Patent Number: 4,772,086
[45] Date of Patent: Sep. 20, 1988

[54] OPTICAL FIBER INTEGRATED OPTICAL DEVICE COUPLER

[75] Inventors: Richard Bellerby, Bishop's Stortford; Michael F. Grant, Harlow, both of Great Britain

[73] Assignee: STC PLC, London, England

[21] Appl. No.: 934,440

[22] Filed: Nov. 24, 1986

[30] Foreign Application Priority Data

Dec. 13, 1985 [GB] United Kingdom ............... 8530797

[51] Int. Cl.$^4$ .............................................. G02B 6/30
[52] U.S. Cl. ............................... 350/96.17; 350/96.20
[58] Field of Search ............... 350/96.17, 96.20, 96.21

[56] References Cited

U.S. PATENT DOCUMENTS 4,474,429 10/1984 Yoldas et al. .............. 350/96.17 X
4,639,074 1/1987 Murphy .................... 350/96.20 X
4,647,147 3/1987 Pikulski et al. .............. 350/96.17

FOREIGN PATENT DOCUMENTS 0064808 4/1984 Japan .................. 350/96.20
0014206 1/1985 Japan .................. 350/96.17
0060606 4/1985 Japan .................. 350/96.17

Primary Examiner—Eugene R. Laroche
Assistant Examiner—Seung Ham
Attorney, Agent, or Firm—Lee & Smith

[57] ABSTRACT

An arrangement for coupling an optical fiber (1) to a waveguide (8) which forms part of an integrated optical device (4) uses a block (3) with a narrow slot (2) to receive the bared fiber end. On top of this block is a retaining block (6), of transparent material such as glass. These are held together by epoxy, and the front face rendered smooth. A polishing block (10) is glued to the edge of the IO device (4), and the end of the block is polished. Then the fiber and the guide on the IO device are brought together in proper alignment and secured together.

3 Claims, 1 Drawing Sheet

OPTICAL FIBER INTEGRATED OPTICAL DEVICE COUPLER

BACKGROUND OF THE INVENTION

This invention relates to the coupling of optical fibres to integrated optics devices such as waveguides, the coupling having low losses and being rugged and temperature stable.

A major problem in integrated optics (IO) is that of coupling input and output optical fibres to IO devices in such a way that the alignment is mechanically stable and insensitive to temperature variations, but which allows accurate initial positioning of the fibres and waveguide. This is essential to minimise the losses incurred at the interfaces.

SUMMARY OF THE INVENTION

An object of the invention is to provide a fibre-to-waveguide coupling which is improved in respect of the aspects mentioned above.

According to the invention there is provided an arrangement for coupling an optical fibre to an integrated optical (IO) device, in which a bared end of the optical fibre is secured in a slot in one surface of a first block of a similar material to that from which the IO device is made, in which a second block which is also of an optically transparent material is secured to said one surface, the whole being secured together by an optically compatible glue or the like, in which the end faces of the blocks are polished smooth to give a flush end face with which the fibre end is also flush, in which the assembly of said blocks is secured to the end of the IO device with the optical fibre aligned with and coupled to a waveguide on the IO device, and in which a third block is mounted over the said waveguide, the two assemblies thus produced being secured together by an optically compatible glue or the like.

The outer diameter of the cladding of an optical fibre as used in the arrangement to be described is typically 125 microns, in which the optical power is confined to a central region approximately 10 microns in diameter. Efficient coupling of the power into an IO waveguide requires this central region to be accurately aligned with a similarly-sized region at the end of the IO device. This region lies close to the upper surface of the crystal in which the device has been formed.

Current research is concerned mainly with waveguides in lithium niobate ($LiNbO_3$), but the method is equally applicable to other materials.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
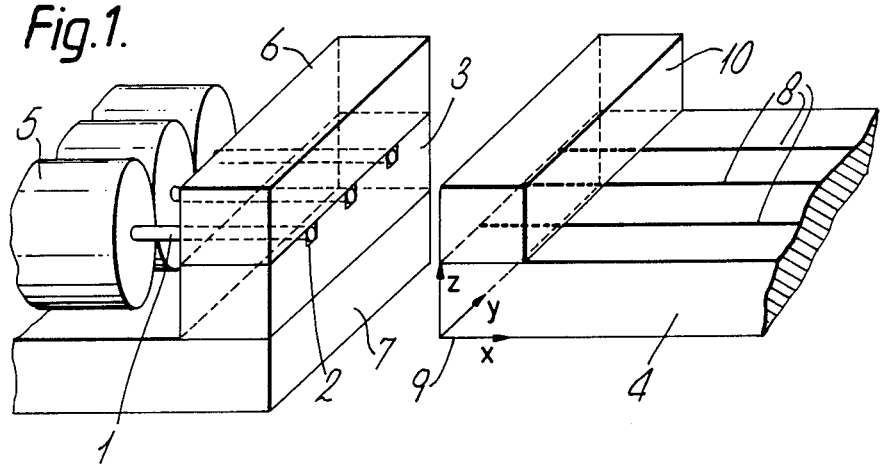
FIG. 1 is a perspective assembly drawing of a fibre-guide coupling embodying the invention.
Figure 2:
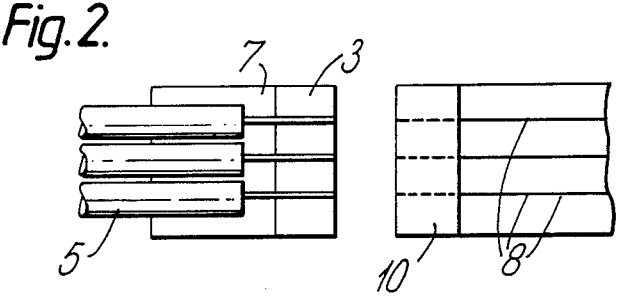
FIG. 2 is a plan view of the assembly of FIG. 1.

Referring to FIGS. 1 and 2, an optical fibre 1 is accommodated in a narrow slot 2 cut in a piece of lithium niobate 3 which is chosen to have its crystal axes parallel to the corresponding x, y, z axes of the device 4, which is an IO device. The slot 2 may be formed by sawing, using a fine circular saw, or by ion-beam etching which confers the advantages of photolithographic accuracy in fibre positioning. The former method is suitable for coupling a single fibre and waveguide, while the latter enables several fibres to be positioned simultaneously with respect to a set of waveguides on the same wafer, as is the case in FIG. 1.

A short length of the fibre coating 5 is stripped off and the exposed glass fibre is glued into the slot with an epoxy. A retaining block 6 is attached to the upper surface of the block 3, which is in turn mounted on a base plate 7. The block 6 serves both to restrict movement of the fibre in the upward direction during temperature fluctuations, and to provide additional surface area when glueing the entire fibre-termination assembly to the end of the waveguide.

The entire end-faces of the fibre-termination assembly and the device are polished to improve the quality of the optical surfaces and to enable them to be brought into intimate contact during positioning.

The IO device 4 includes a crystal of lithium niobate $LiNbO_3$ in the surface of which are formed waveguides 8 to which coupling is to be effected. The crystal axes x, y and z are indicated at 9. Above the end of the crystal 4 there is a polishing block 10, preferably also of lithium niobate, but in any case, like block 6, of transparent material. This block 10 is glued to the upper surface of the wafer 4 to prevent chips occurring at the end of the waveguide during positioning. The procedure is unchanged if the guides are coated with a dielectric film and electrodes.

The alignment of fibre and guide is optimised by monitoring the optical throughput power. The faces of the fibre-termination assembly and the device are then glued using a thin film of ultra-violet curing epoxy to keep the separation of fibre and guide to a minimum.

The relatively large area over which the surfaces of the elements are bonded provides a mechanically rugged structure. Matching the crystal axes of all the constituents ensures that the temperature stability is limited by the behaviour of the epoxy rather than by differential thermal expansion of the materials. Using polished blocks on both elements, and transparent adhesives, aids preliminary visual alignment.

Thus we provide a method of fibre to IO waveguide coupling which is mechanically rugged and offer advantages over silicon V-grooves because the temperature coefficients of the device and the fibre termination assembly are matched, and because the fibre and guide can be viewed through the upper blocks to aid preliminary alignment.

Figure 3:
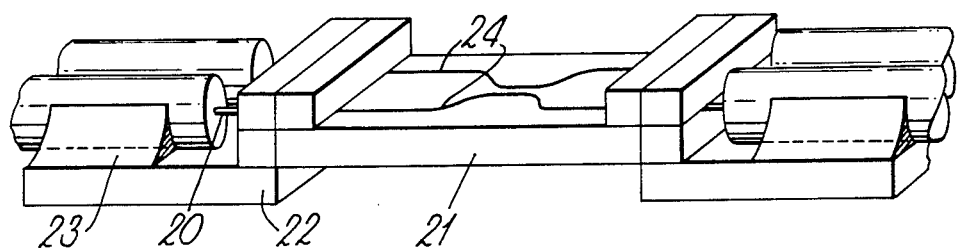
FIG. 3 shows input and output fibres coupled to an IO device.

FIG. 3 shows an arrangement in which two input optical fibres such as 20 are coupled to one end of a lithium niobate crystal 21, the claddings of the fibres being secured to the base plate 22 by adhesive as indicated at 23. The IO device has waveguides 24 formed on its upper surface. The two output optical fibres are similarly arranged to the two input waveguides.

We claim:

1. An arrangement for coupling an optical fibre to an integrated optical (IO) device, in which:

a bared end of the optical fibre is secured in a slot in one surface of a first block of a similar material to that from which the IO device is made;

a second block which is of an optically transparent material is secured to said one surface over the bare end of the optical fibre;

each said block has an end face and the end faces of the blocks are polished smoothly to give a flush end face for both said blocks, the fibre end being also flush with said end face;

said blocks with said fibre together form an assembly which is secured to an end face of the IO device with the optical fibre aligned with and coupled to an optical waveguide on the IO device; and a third block is mounted over said waveguide, which third block has an end face which is a coplanar with said end face of the IO device, such that said third block and the IO device together form a second assembly which is secured to said first assembly.

2. An arrangement as claimed in claim 1, in which the first block is secured to a base plate to which said optical fibres' cladding is also secured.

3. An arrangement as claimed in claim 1, in which the first and second blocks accommodate two or more optical fibres, which are coupled respectively to two or more waveguides on the IO device.

* * * * *